A. G. SUDERMAN.
CORN HOLDER.
APPLICATION FILED APR. 27, 1920.
1,391,283. Patented Sept. 20, 1921.
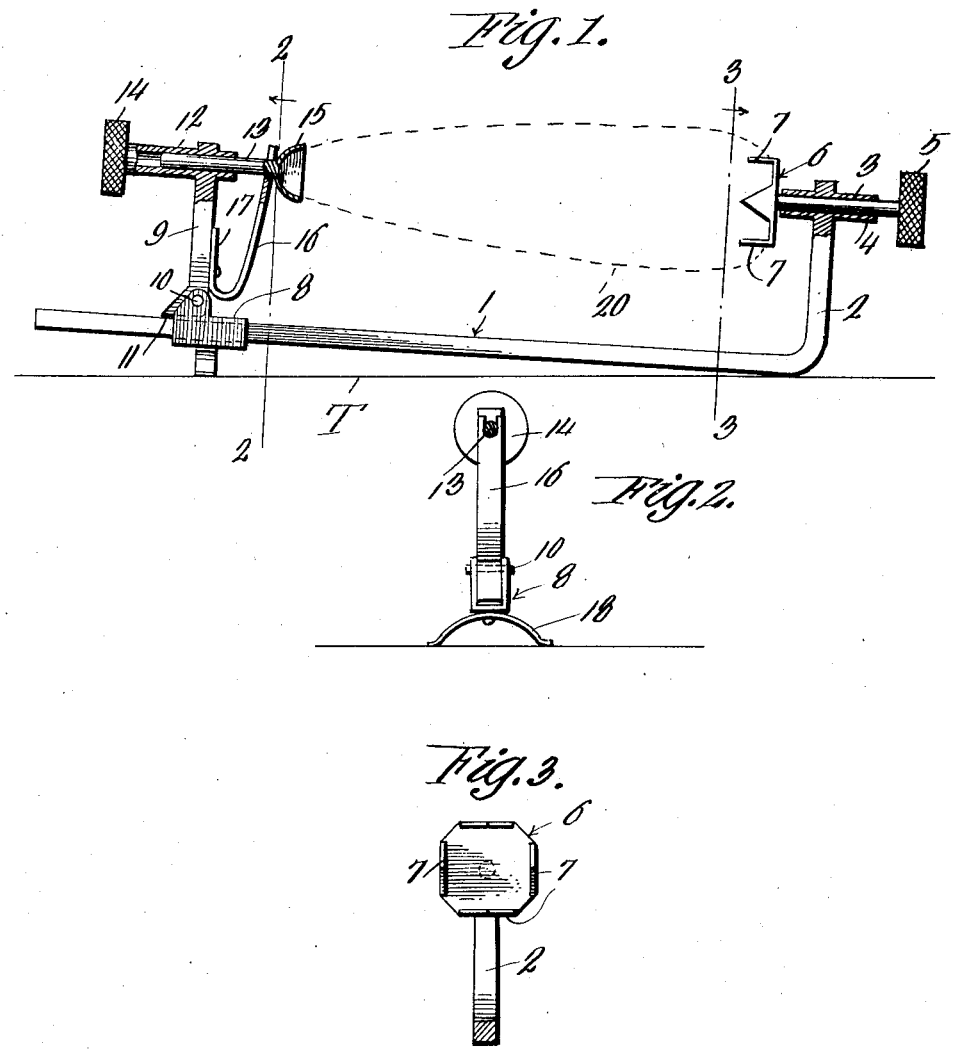
WITNESSES
A. G. SUDERMAN INVENTOR.
BY
ATTORNEY.

UNITED STATES PATENT OFFICE.

ALBERT G. SUDERMAN, OF RIVER ROUGE, MICHIGAN.

CORN-HOLDER.

1,391,283.   Specification of Letters Patent.   Patented Sept. 20, 1921.

Application filed April 27, 1920.   Serial No. 376,981.

*To all whom it may concern:*

Be it known that I, ALBERT G. SUDERMAN, a citizen of the United States, residing at River Rouge, in the county of Wayne and State of Michigan, have invented certain new and useful Improvements in a Corn-Holder, of which the following is a specification.

This invention relates to a device for holding ears of corn which are commonly served hot at the table.

The object of the invention is to provide a simple and inexpensive corn holder which may be easily and conveniently manipulated for buttering and eating without the fingers contacting therewith and which is neat in appearance.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a device constructed in accordance with this invention, shown partly in section.

Fig. 2 is a transverse vertical section taken on the line 2—2 of Fig. 1, and

Fig. 3 is a similar view taken on the line 3—3 of Fig. 1.

In the embodiment illustrated, an L-shaped base member or bar 1 is shown, the short arm 2 of which projects upwardly and has mounted at its free end a laterally disposed sleeve 3 to form a bearing for a shaft 4. This shaft 4 has a knurled knob 5 at its outer end for manipulating the shaft, while its inner end is equipped with a plate 6 having penetrating spurs on its inner face. These spurs 7 may be of any suitable or desired construction, being here shown triangular in shape and are adapted to penetrate the stalk end of the ear of corn 20 as is shown clearly in Fig. 1.

A slide 8 is mounted on the bar 1 and has extending laterally therefrom a movable arm 9 projecting in the same direction as the arm 2 and lying substantially parallel therewith. This arm 9 is pivoted at its inner end as shown at 10 between ears carried by the slide 8 and has a toe or dog 11 which is adapted to be forced into biting engagement with the bar 1 by a spring 16 for locking the slide in adjusted position.

The free end of arm 9 has a sleeve 12 preferably made integral therewith which is arranged in alinement with sleeve 3 and is designed to form a bearing for a shaft 13. This sleeve 12 carries on its outer end an integral knurled knob 14 which facilitates handling of the frame. A cup shaped member 15 is carried by the inner end of shaft 13 and is adapted to receive the nub end of the corn ear 20.

The spring 16 which forces the toe 11 of arm 9 into biting engagement with bar 1 has one end bent as shown at 17 and secured to the inner face of arm 9 while its other end is bifurcated and straddles shaft 13 and exerts its tension against the cap 15 to force said cap into gripping engagement with the ear of corn 20. The spring 16 thus performs the double function of means for actuating the biting toe 11 of arm 9 and to yieldably hold the gripping member 15 in operative position.

Mounted on the lower face of the slide 8 is a support 18 which may be of any suitable or desired construction being here shown elliptical in form and arranged transversely of the slide to support the bar at one end above the table T when the device rests on the table.

In the use of this invention when it is desired to clamp an ear of corn 20 between the members 6 and 15 all that is necessary is to move the slide 8 rearward until the members 6 and 15 are separated a distance the length of the ear 20. After the corn has been placed between members 6 and 15 the slide 8 is moved forward until spring 16 bearing on cup 15 forces the ear 20 against the prongs 7 of member 6 so that said ear is held by said member against turning relative thereto. After the corn has been placed between members 6 and 15 the spring 16 bearing on cap 15 forces the ear 20 against the prongs 7 of member 6 so that said ear is securely held by said member against turning relative thereto and said spring simultaneously forces the toe into biting engagement with bar 1 thereby locking arm 9 and bar 1 together. After the ear has been so mounted it will be obvious that it may be turned by grasping knob 5 and rotating shaft 3, and thereby provide for the buttering, salting, et cetera of the ear and to facilitate eating of the corn.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

An ear corn holder comprising a base bar having a fixed arm extending laterally therefrom, and a movable arm slidable thereon, bearings carried by said arms, shafts rotatable and slidable in said bearings, ear penetrating elements carried by the inner end of one shaft and a cap by the inner end of the other, means on the outer end of one shaft for rotating it, and bar gripping means carried by the movable arm to hold said arm in adjusted position, and a spring secured at one end to said movable arm and bearing at its other end against said cap whereby the movable arm is forced into biting engagement with the bar, and the cap clampingly engaged with the ear of corn to be held.

In testimony whereof I affix my signature in presence of two witnesses.

ALBERT G. SUDERMAN.

Witnesses:
JOSEPH O. CLAIRE,
CLAUD C. RIOPELLE.